(12) United States Patent
Park et al.

(10) Patent No.: US 12,515,490 B2
(45) Date of Patent: Jan. 6, 2026

(54) APPARATUS OF MULTI-AIR MODE FOR VEHICLE AIR CONDITIONER AND METHOD OF CONTROLLING THE SAME

(71) Applicants: HYUNDAI MOTOR COMPANY, Seoul (KR); KIA CORPORATION, Seoul (KR)

(72) Inventors: JiMin Park, Suwon-si (KR); Yongchul Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/627,987

(22) Filed: Apr. 5, 2024

(65) Prior Publication Data

US 2024/0246386 A1 Jul. 25, 2024

Related U.S. Application Data

(62) Division of application No. 17/188,068, filed on Mar. 1, 2021, now abandoned.

(30) Foreign Application Priority Data

Aug. 11, 2020 (KR) .................... 10-2020-0100674

(51) Int. Cl.
*B60H 1/00* (2006.01)
*B60K 35/10* (2024.01)
*B60K 35/20* (2024.01)

(52) U.S. Cl.
CPC ..... *B60H 1/00028* (2013.01); *B60H 1/00564* (2013.01); *B60H 1/00735* (2013.01);
(Continued)

(58) Field of Classification Search
CPC .................................................. B60H 1/00871
(Continued)

(56) References Cited

U.S. PATENT DOCUMENTS

| 4,874,010 A | 10/1989 | Dejong et al. |
| 5,337,802 A | 8/1994 | Kajino et al. |

(Continued)

FOREIGN PATENT DOCUMENTS

| CN | 105691144 A | 6/2016 |
| CN | 106476562 A | 3/2017 |

(Continued)

*Primary Examiner* — Ko-Wei Lin
(74) *Attorney, Agent, or Firm* — Lempia Summerfield Katz LLC

(57) ABSTRACT

A method of controlling an apparatus of multi-air mode for an air conditioner of a vehicle includes turning on power to the air conditioner, by a driver using an air conditioner operation unit provided in the vehicle. The method includes: determining, by a controller, whether a driver has turned on a multi-air mode through the air conditioner operation unit; in response to determining that the multi-air mode is turned on, operating, by the controller, the air conditioner in the multi-air mode; determining, by the controller, whether an intensity of air discharged from the air conditioner is greater than or equal to a first stage; and in response to determining that the intensity of air discharged from the air conditioner is greater than or equal to the first stage, automatically adjusting, by the controller, the intensity of the air to a second stage less than the first stage.

4 Claims, 14 Drawing Sheets

(52) U.S. Cl.
CPC ..... *B60H 1/00828* (2013.01); *B60H 1/00964* (2013.01); *B60K 35/10* (2024.01); *B60K 35/20* (2024.01); *B60H 2001/00192* (2013.01)

(58) Field of Classification Search
USPC .................................................. 454/69–165
See application file for complete search history.

(56) References Cited

U.S. PATENT DOCUMENTS

| | | | |
|---|---|---|---|
| 6,409,590 | B1 | 6/2002 | Suzuki et al. |
| 11,161,390 | B2 | 11/2021 | Sakane |
| 11,498,392 | B2 | 11/2022 | Williams et al. |
| 2006/0222672 | A1* | 10/2006 | Ezaka ................. A61L 9/125 128/200.23 |
| 2009/0088062 | A1 | 4/2009 | Major et al. |
| 2010/0181061 | A1 | 7/2010 | Ozeki |
| 2011/0201263 | A1 | 8/2011 | Srinivasan et al. |
| 2012/0102973 | A1 | 5/2012 | Oh |
| 2014/0034266 | A1 | 2/2014 | Tabei et al. |
| 2015/0328958 | A1 | 11/2015 | Winget, Jr. et al. |
| 2015/0336439 | A1 | 11/2015 | Wang et al. |
| 2016/0167477 | A1 | 6/2016 | Kang et al. |
| 2016/0355072 | A1 | 12/2016 | Park |
| 2017/0166031 | A1 | 6/2017 | Shin et al. |
| 2017/0253107 | A1 | 9/2017 | Castiglioni et al. |
| 2017/0291468 | A1 | 10/2017 | Jung et al. |
| 2018/0001736 | A1 | 1/2018 | Kim et al. |
| 2018/0093545 | A1 | 4/2018 | Park et al. |
| 2018/0326812 | A1 | 11/2018 | Ko et al. |
| 2019/0351737 | A1 | 11/2019 | Hashimoto |
| 2019/0366806 | A1 | 12/2019 | Pestke |
| 2020/0047590 | A1 | 2/2020 | Tanaka |
| 2020/0171911 | A1 | 6/2020 | Sawada et al. |
| 2020/0262270 | A1 | 8/2020 | Williams et al. |
| 2020/0369112 | A1 | 11/2020 | Carbone et al. |
| 2020/0406713 | A1 | 12/2020 | Spunar et al. |
| 2021/0107337 | A1 | 4/2021 | Othmer |
| 2021/0206226 | A1 | 7/2021 | Lee et al. |
| 2022/0048356 | A1* | 2/2022 | Park ................... B60H 1/00735 |

FOREIGN PATENT DOCUMENTS

| | | |
|---|---|---|
| CN | 107438527 A | 12/2017 |
| CN | 207416476 U | 5/2018 |
| FR | 2912085 A1 | 8/2008 |
| JP | 2005289107 A | 10/2005 |
| KR | 20080054944 A | 6/2008 |
| KR | 20080078298 A | 8/2008 |

* cited by examiner

APPARATUS OF MULTI-AIR MODE FOR VEHICLE AIR CONDITIONER AND METHOD OF CONTROLLING THE SAME

CROSS-REFERENCE TO RELATED APPLICATIONS

This application is a divisional application of non-provisional U.S. patent application Ser. No. 17/188,068, filed on Mar. 1, 2021, which claims priority to and the benefit of Korean Patent Application No. 10-2020-0100674, filed on Aug. 11, 2020, the entire contents of each of which are incorporated herein by reference.

FIELD

The present disclosure relates to an apparatus of multi-air mode for vehicle air conditioner and method of controlling the same. More particularly, the present disclosure relates to an apparatus of multi-air mode for vehicle air conditioner and method of controlling the same for providing a pleasant vehicle environment by providing wind discharged through various air discharge units in a vehicle interior.

BACKGROUND

The statements in this section merely provide background information related to the present disclosure and may not constitute prior art.

In general, a vehicle is equipped with an air conditioner (air conditioner) to increase the comfort and comfort of passengers in the vehicle while driving the vehicle and to promote safe operation. The occupant can appropriately maintain the temperature, humidity, and air environment in the vehicle by using the air conditioner according to changes in the surrounding environment.

The occupant can adjust the flow rate and temperature of the air discharged from the air conditioner, and change the direction in which air is discharged, thereby creating a comfortable indoor environment.

In general, the discharge port of the air conditioner includes a left air vent discharge port on the left side of a driver's seat inside a vehicle, a right air vent discharge port on the right side of the passenger seat, and a central air vent discharge port between the driver's seat and the passenger seat. However, the vent outlet is not formed on the right side of the driver's seat and in front of the passenger seat, but is blocked. Therefore, we have discovered that there is a limit to blowing sufficient air to the driver's seat and the passenger seat during the operation of the air conditioner. In addition, automatic adjustment of the air volume intensity that provides optimum comfort according to the air volume intensity of the air conditioner and the temperature change inside the vehicle is not performed.

The above information disclosed in this Background section is only for enhancement of understanding of the background of the present disclosure, and therefore it may contain information that does not form the prior art that is already known to a person of ordinary skill in the art.

SUMMARY

The present disclosure provides an apparatus of multi-air mode for vehicle air conditioner and method of controlling the same for providing wind discharged through various air discharge units of an air conditioner inside a vehicle and adjusting the air volume according to an internal condition of the vehicle to provide a comfortable vehicle interior environment.

An apparatus of multi-air mode for vehicle air conditioner according to an exemplary form of the present disclosure includes an air conditioner (HVAC) provided in the vehicle and supplying air into the vehicle, an air duct unit in communication with the air conditioner and provided to deliver air supplied from the air conditioner to the inside of the vehicle or to discharge it to the outside, and a multi-air discharge unit in which the air delivered from the air duct unit is discharged into the vehicle.

The air duct unit may include a defrost duct for delivering air for defrosting inside the vehicle, a multi-air duct for transferring air for cooling and heating into the vehicle through the multi-air discharge unit, and a vent duct for discharging the air inside the vehicle to the outside.

The air duct unit may further include a floor duct for transferring air for heating and cooling to a floor inside the vehicle.

The multi-air discharge unit may include a left side discharge unit through which air is discharged toward the driver's seat inside the vehicle, and a right side discharge unit through which air is discharged toward the passenger seat inside the vehicle.

The multi-air discharge unit may include a mesh-shaped multi-air discharge hole.

The multi-air discharge hole may be formed so as not to be visible from a passenger's view when seating in the driver's seat and the passenger seat of the vehicle.

The multi-air discharge unit may have a multi-layer structure having a stepped portion.

The air duct unit may include a dome door that enables the air supplied from the air conditioner to fluidly communicate with the defrost duct, multi-air duct, and vent duct, respectively, and is disposed between the air conditioner and the air duct unit.

The air duct unit may include a plurality of flat doors that enables the air supplied from the air conditioner to fluidly communicate with the defrost duct, the multi-air duct, and the vent duct, respectively. In one form, flat doors of the plurality flat doors are disposed between the air conditioner and the defrost duct, between the air conditioner and the multi-air duct, and between the air conditioner and the vent duct.

The air conditioner and the multi-air duct may be pressure-sealed with each other by a rubber pad.

In another form of the present disclosure, a method of controlling an apparatus of multi-air mode for an air conditioner of a vehicle includes: turning on power to the air conditioner through an air conditioner operation unit provided in the vehicle by a driver, determining, by a controller, whether a driver has turned on the multi-air mode through the air conditioner operation unit, operating, by the controller, the air conditioner in a multi-air mode when it is determined that the multi-air mode is turned on, determining, by the controller, whether the intensity of air discharged from the air conditioner is greater than or equal to a first stage, and automatically adjusting, by the controller, the intensity of the air to a second stage smaller than the first stage when it is determined that the intensity of air discharged from the air conditioner is greater than or equal to the first stage.

In other form, the method of controlling an apparatus of multi-air mode for vehicle air conditioner may further include, after automatically adjusting, by the controller, the intensity of the air to a second stage smaller than the first stage, determining, by the controller, whether the intensity of the air discharged from the air conditioner is manually selected, operating in the manually selected stage when it is determined that the intensity of the air discharged from the air conditioner is manually selected, determining, by the controller, whether the driver has turned off the multi-air mode through the air conditioner operation unit, and operating, by the controller, the air conditioner in a state before the multi-air mode is turned on when it is determined that the multi-air mode is turned off.

In other form, the method of controlling an apparatus of multi-air mode for vehicle air conditioner may further include, when it is not determined that the multi-air mode is turned on, operating, by the controller, the air conditioner in a state before the multi-air mode is turned on.

In one form, the method of controlling an apparatus of multi-air mode for vehicle air conditioner may further include, when it is not determined that the intensity of air discharged from the air conditioner is greater than or equal to the first stage, maintaining, by the controller, the intensity of the air in a state before the first stage.

In some forms of the present disclosure, the method of controlling an apparatus of multi-air mode for vehicle air conditioner may further include, when it is not determined that the intensity of the air discharged from the air conditioner is manually selected, maintaining, by the controller, the intensity of air in a state of the second stage.

In some forms of the present disclosure, a method of controlling an apparatus of multi-air mode for vehicle air conditioner includes: turning on power to the air conditioner through an air conditioner operation unit provided in the vehicle by the driver, determining, by a controller, whether a driver has turned on an auto mode through the air conditioner control unit, operating, by the controller, the air conditioner in an automatic mode when it is determined that the auto mode has turned on, determining, by the controller, whether the vehicle interior temperature has reached a first target temperature, switching, by the controller, to the multi-air mode and discharging air from the multi-air duct, the vent duct, and the floor duct into the vehicle interior and reducing the intensity of the air when it is determined that the vehicle interior temperature has reached the first target temperature, determining, by the controller, whether the vehicle interior temperature has reached a second target temperature lower than the first target temperature, discharging, by the controller, air only from the multi-air duct to the interior of the vehicle and further reducing the intensity of the air when it is determined that the vehicle interior temperature has reached the second target temperature, determining, by the controller, whether the driver has turned off the automatic mode through the air conditioner operation unit, and turning off, by the controller, the automatic mode when it is determined that the automatic mode has turned off.

The method of controlling an apparatus of multi-air mode for vehicle air conditioner according to another exemplary form of the present disclosure may further include, when it is not determined that the auto mode has turned on, maintaining, by the controller, a manual mode.

The method of controlling an apparatus of multi-air mode for vehicle air conditioner according to another exemplary form of the present disclosure may further include, when it is not determined that the automatic mode has turned off, maintaining, by the controller, an automatic mode.

The method of controlling an apparatus of multi-air mode for vehicle air conditioner according to another exemplary form of the present disclosure may further include, when it is not determined that the vehicle interior temperature has reached the first target temperature, or when it is not determined that the vehicle interior temperature has reached the second target temperature, operating, by the controller, the air conditioner in a state before the vehicle interior temperature reaches the first target temperature or the vehicle interior temperature does not reach the second target temperature.

As described above, according to exemplary forms of the present disclosure, it is possible to provide a comfortable vehicle interior environment by providing wind discharged through various air discharge units of the air conditioner inside the vehicle and adjusting the air volume according to the internal conditions of the vehicle.

In addition, by providing multiple air discharge holes on the extension line with the existing air discharge holes so that they are not visible to the passenger's view when seating, there is an effect as if a separate hole was not formed in design.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
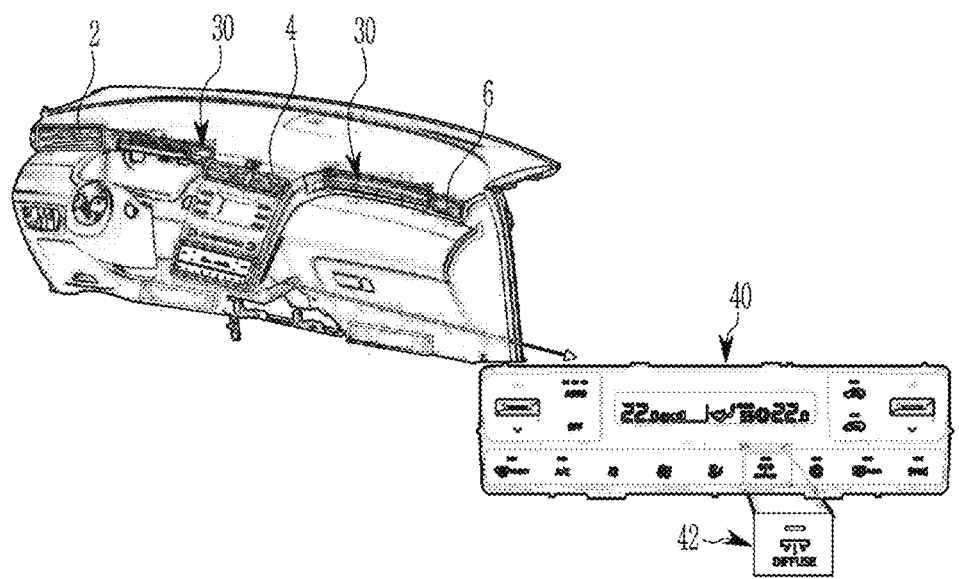
FIG. 1 is a diagram illustrating an exterior of a vehicle interior to which an apparatus of multi-air mode for vehicle air conditioner according to an exemplary form of the present disclosure is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

Further, in exemplary forms, since like reference numerals designate like elements having the same configuration, a first exemplary form is representatively described, and in other exemplary forms, only configurations different from the first exemplary form will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary form of the present disclosure shows an exemplary form of the present disclosure in detail. As a result, various modifications of the drawings will be expected. Therefore, the exemplary form is not limited to a specific aspect of the illustrated region, and for example, includes modifications of an aspect by manufacturing.

Now, an apparatus of multi-air mode for vehicle air conditioner according to an exemplary form of the present disclosure will be described with reference to attached drawings.

Figure 2:
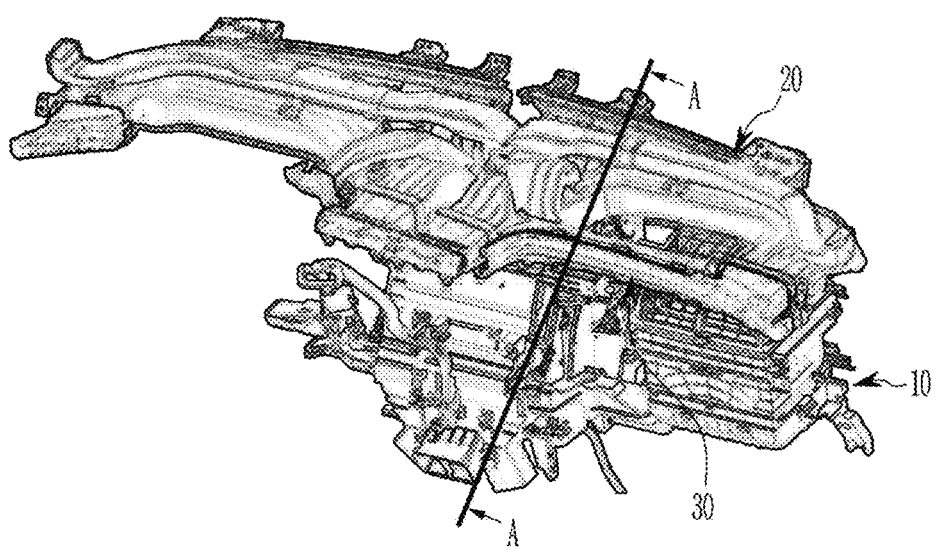
FIG. 2 is a view showing an apparatus of multi-air mode for vehicle air conditioner according to an exemplary form of the present disclosure.
Figure 3:
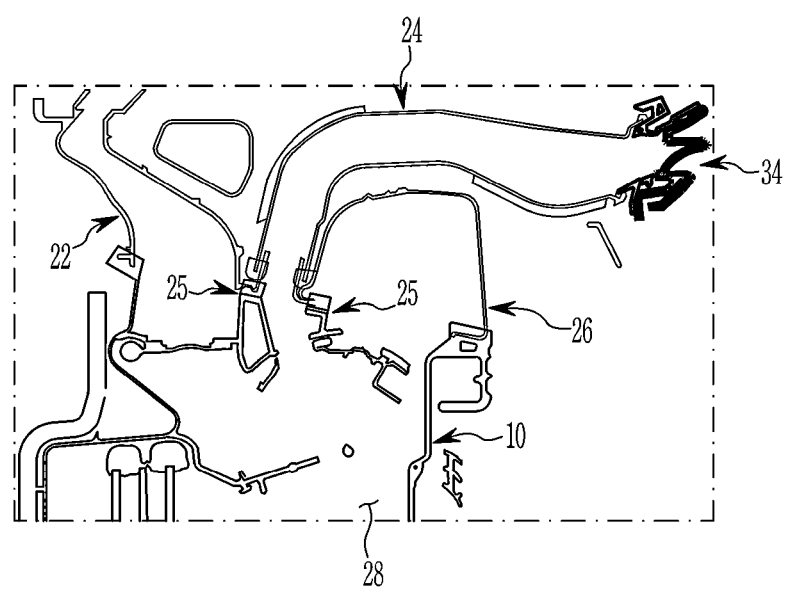
FIG. 3 is a cross-sectional view taken along line A-A of FIG. 2.
Figure 4:
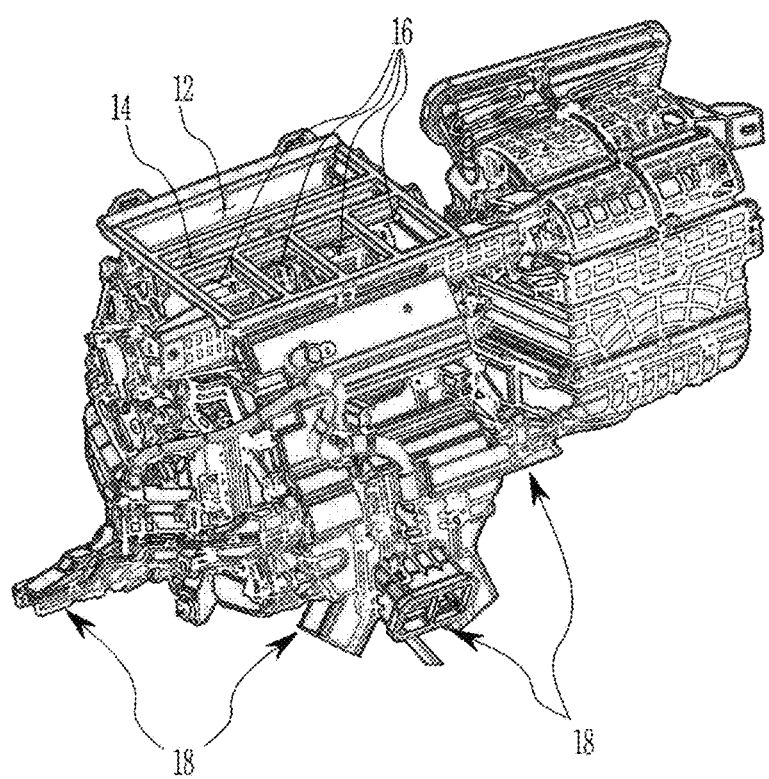
FIG. 4 is a view showing an air conditioner of an apparatus of multi-air mode for vehicle air conditioner according to an exemplary form of the present disclosure.

FIG. 1 is a diagram illustrating an exterior of a vehicle interior to which an apparatus of multi-air mode for vehicle air conditioner according to an exemplary form of the present disclosure is applied, FIG. 2 is a view showing an apparatus of multi-air mode for vehicle air conditioner according to an exemplary form of the present disclosure, FIG. 3 is a cross-sectional view taken along line A-A of FIG. 2, and FIG. 4 is a view showing an air conditioner of an apparatus of multi-air mode for vehicle air conditioner according to an exemplary form of the present disclosure.

Referring to FIG. 1 and FIG. 2, an apparatus of multi-air mode for vehicle air conditioner according to an exemplary form of the present disclosure includes an air conditioner (HVAC), an air duct unit, and a multi-air discharge unit.

The air conditioner (HVAC) 10 provides air to the inside of the vehicle and is a device desired to achieve the purpose of air conditioning, and includes heat source devices such as boilers and refrigerators, heat transfer devices and end devices such as blowers, pumps, ducts, pipes, outlets, suction ports, radiators, etc., and controllers, etc. that perform operations so that these devices can satisfy the conditions of air conditioning. The air supplied into the vehicle by the air conditioner is used for cooling and heating inside the vehicle, controlling humidity, and removing harmful gases/dust.

The air duct unit 20 communicates with the air conditioner 10 and is provided to deliver air supplied from the air conditioner 10 to the inside of the vehicle or to discharge it to the outside. As shown in FIG. 3, the air duct unit 20 may include a defrost duct 22 for delivering air for defrosting inside the vehicle, a multi-air duct 24 for delivering air for cooling and heating into the vehicle through the multi-air discharge unit 30, and a vent duct 26 for discharging the air inside the vehicle to the outside.

As shown in FIG. 4, the air conditioner 10 includes a defrost discharge hole 12, a multi-air discharge hole 14, and a vent hole 16, and the defrost duct 22, the multi-air duct 24, and the vent duct 26 of the air duct unit 20 communicate with each of these. Air supplied from the air conditioner 10 is supplied to the indoor through the defrost duct 22, the multi-air duct 24, and the vent duct 26 through the defrost discharge hole 12, the multi-air discharge hole 14, and the vent hole 16, respectively according to its purpose. The air conditioner 10 is further provided with a floor discharge hole 18 for transferring air to the floor inside the vehicle, and the floor discharge hole 18 communicates with the floor duct 28 which may be additionally provided in the air duct unit 20 to supply air to the floor surface inside the vehicle.

Meanwhile, the multi-air duct 24 may be pressure-sealed with each other by a multi-air discharge hole 14 of the air conditioner 10 and a pad 25 made of a rubber material.

The air generated in the air conditioner 10 is discharged into the vehicle through the air duct unit 20 and the multi-air discharge unit 30. As shown in FIG. 1, the multi-air discharge unit 30 includes a left side discharge unit 32 through which air is discharged toward a driver's seat inside the vehicle, and a right side discharge unit 34 through which air is discharged toward a passenger seat inside the vehicle.

In the existing vehicle, only the vent outlets 2, 4 and 6 on the left side of the driver's seat, the center of the vehicle, and the right side of the passenger's seat were provided. The multi-air discharge unit 30 according to an exemplary form of the present disclosure is provided in the driver's seat and the passenger seat in addition to the existing vent discharge outlets 2, 4, and 6. As shown in FIG. 1, the multi-air discharge unit 30 may be provided on the right side of the driver's seat and in the center of the passenger seat.

Figure 5:
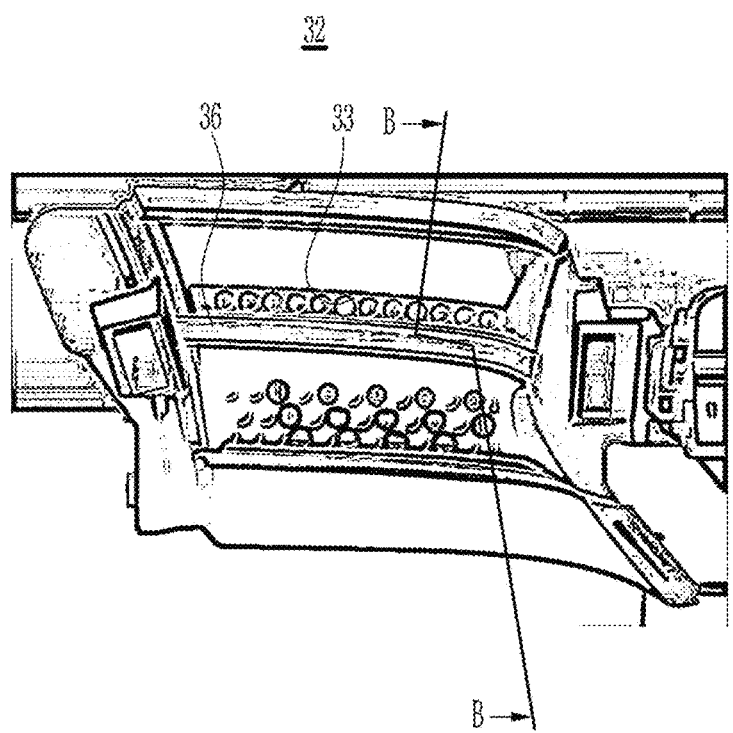
FIG. 5 is a view showing a left side discharge unit of an apparatus of multi-air mode for vehicle air conditioner according to an exemplary form of the present disclosure.
Figure 6:
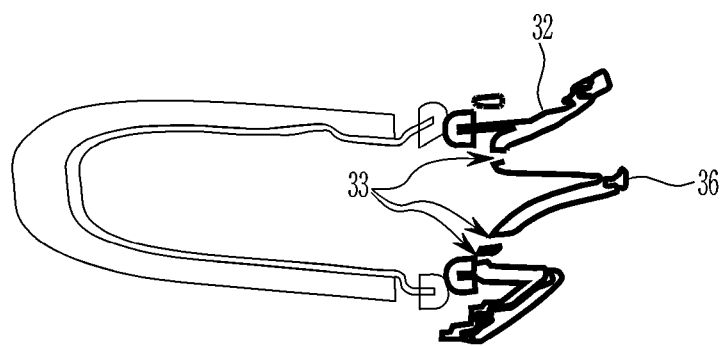
FIG. 6 is a cross-sectional view taken along line B-B of FIG. 5.

FIG. 5 is a view showing a left side discharge unit of an apparatus of multi-air mode for vehicle air conditioner according to an exemplary form of the present disclosure, and FIG. 6 is a cross-sectional view taken along line B-B of FIG. 5.

As shown in FIG. 5 and FIG. 6, the left side discharge unit 32 is provided on the right side of the driver's seat, and a mesh-shaped multi-air discharge hole 33 is formed. The multi-air discharge hole 33 may have a radius of about 3 mm or more and about 4 mm or less. In addition, the multi-air discharge unit 30 may be formed in a multi-layered structure having a stepped portion 36, and may be formed of a plastic material. By forming the diameter of the multi-air discharge hole 33 to be about 3 mm or more and formed of a plastic material, it is possible to prevent and reduce the phenomenon that condensed water forms in the multi-air discharge hole 33 due to a temperature difference in the vehicle interior, and secure an air volume and wind speed of a certain amount or more. In addition, the multi-air discharge hole 33 may be configured so that the driver is not visible from the driver's view when seated in the driver's seat. The multi-air discharge hole 33 is provided on an extension line with the existing discharge hole and has the same effect as not forming a separate multi-air discharge hole in design.

Figure 7:
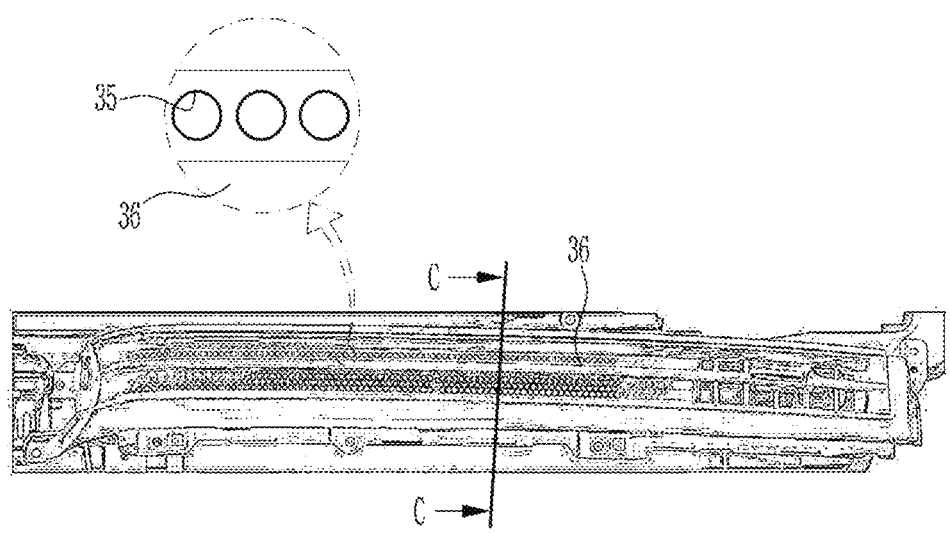
FIG. 7 is a view showing a right side discharge unit of an apparatus of multi-air mode for vehicle air conditioner according to an exemplary form of the present disclosure.
Figure 8:
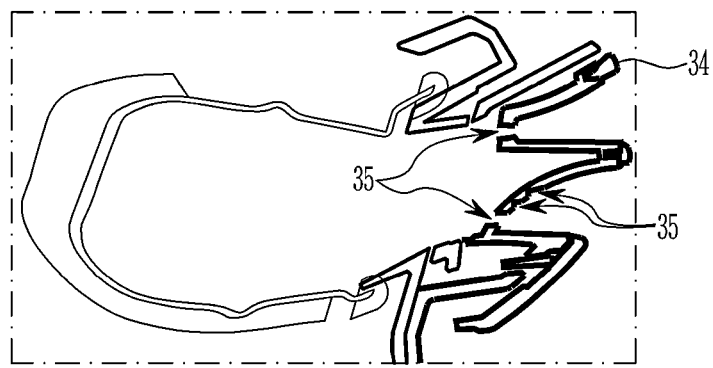
FIG. 8 is a cross-sectional view taken along line C-C of FIG. 7.

FIG. 7 is a view showing a right side discharge unit of an apparatus of multi-air mode for vehicle air conditioner according to an exemplary form of the present disclosure, and FIG. 8 is a cross-sectional view taken along line C-C of FIG. 7.

As shown in FIG. 7 and FIG. 8, the right side discharge unit 34 may be provided in the center of the passenger seat. Like the left side discharge unit 32, the right side discharge unit 34 is formed with a mesh-shaped multi-air discharge hole 35 having a radius of about 3 mm or more and about 4 mm or less. In addition, the multi-air discharge unit 30 may be formed in a multi-layered structure having a stepped portion 36, and may be formed of a plastic material.

The left side discharge unit 32 and the right side discharge unit 34 may have a concave surface shape and then form a multi-air discharge hole 35 on the surface of the corresponding shape. The surface area in which the multi-air discharge hole 35 is formed may be divided into upper and lower portions by the stepped portion 36. In the lower portion of the surface area divided by the stepped portion 36, a multi-air discharge hole 35 may be formed in a shape that is open toward the bottom surface of the vehicle. The multi-air discharge hole 35 may be prevented from being seen from the passenger's view when seated in the driver's seat and the passenger seat due to the oblique natural curve of the multi-air discharge unit 30.

Figure 9:
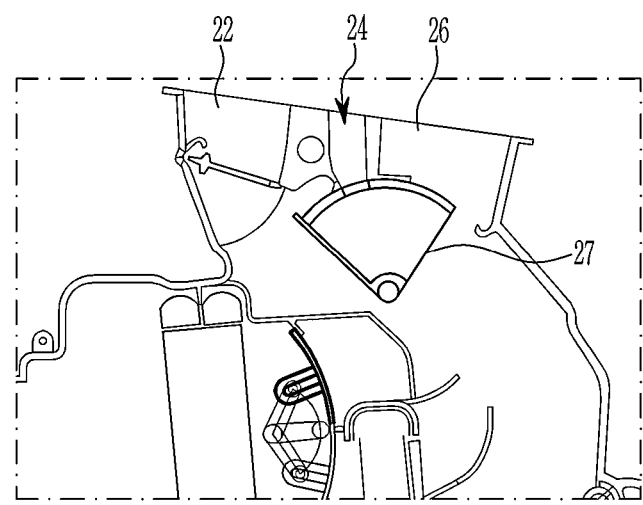
FIG. 9 is a view showing a state in which a dome door is disposed inside an air duct unit of an apparatus of multi-air mode for vehicle air conditioner according to an exemplary form of the present disclosure.
Figure 10:
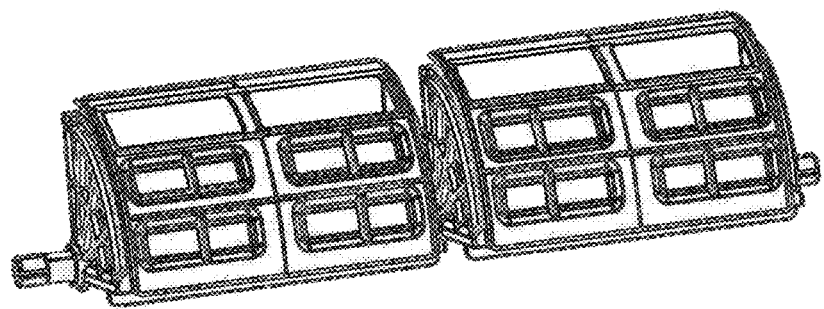
FIG. 10 is a view showing a dome door of an apparatus of multi-air mode for vehicle air conditioner according to an exemplary form of the present disclosure.

FIG. 9 is a view showing a state in which a dome door is disposed inside an air duct unit of an apparatus of multi-air mode for vehicle air conditioner according to an exemplary form of the present disclosure, and FIG. 10 is a view showing a dome door of an apparatus of multi-air mode for vehicle air conditioner according to an exemplary form of the present disclosure. In addition, FIG. 11 is a view showing a state in which a flat door is disposed inside an air duct unit of an apparatus of multi-air mode for vehicle air conditioner according to an exemplary form of the present disclosure, and FIG. 12 is a view showing a flat door of an apparatus of multi-air mode for vehicle air conditioner according to an exemplary form of the present disclosure.

Referring to FIG. 9 to FIG. 12, the air duct unit 20 may include a dome door 27 or a flat door 29. The dome door 27 or the flat door 29 is disposed in the interior between the air conditioner 10 and the air duct unit 20, and can be switched so that the air supplied from the air conditioner 10 communicates with the defrost duct 22, the multi-air duct 24, and the vent duct 26, respectively.

The dome door 27 illustrated in FIG. 9 and FIG. 10, the dome door 27 may have a sectoral shape in cross section, and a plurality of openings are formed on the curved surface to communicate with the defrost duct 22, the multi-air duct 24, and the vent duct 26, respectively. In addition, the plurality of openings are provided with a screening plate that rotate around both axes of the dome door 27. According to the rotation of the screening plate, the defrost duct 22, the multi-air duct 24, and the vent duct 26 and the opening may communicate with each other.

Figure 11:
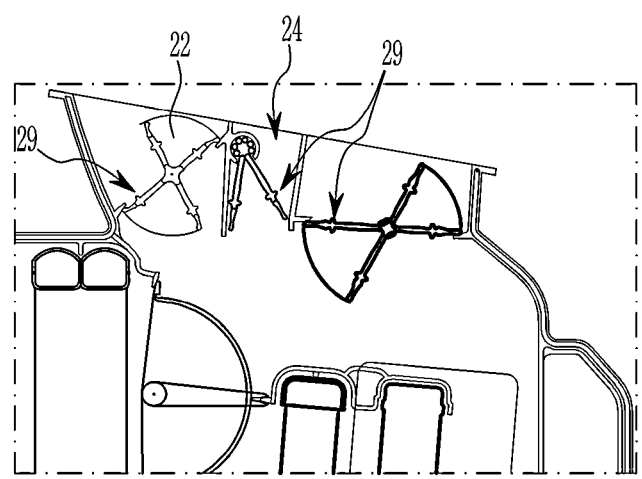
FIG. 11 is a view showing a state in which a flat door is disposed inside an air duct unit of an apparatus of multi-air mode for vehicle air conditioner according to an exemplary form of the present disclosure.
Figure 12:
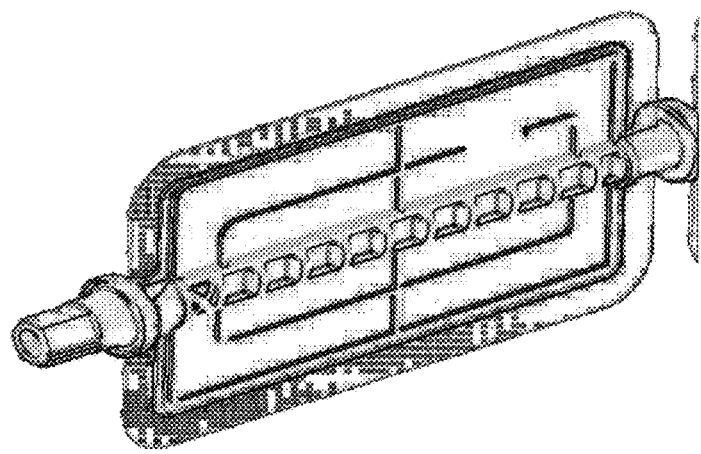
FIG. 12 is a view showing a flat door of an apparatus of multi-air mode for vehicle air conditioner according to an exemplary form of the present disclosure.

The flat door 29 shown in FIGS. 11 and 12 may be provided in plural. The flat doors 29 can be placed on between the air conditioner 10 and the defrost duct 22, between the air conditioner 10 and the multi-air duct 24, and between the air conditioner 10 and the vent duct 26, respectively. The flat door 29 may be formed in a square plate shape, and may be configured to close or open the defrost duct 22, the multi-air duct 24, and the vent duct 26 by rotating around both axes of the square plate.

Figure 13:
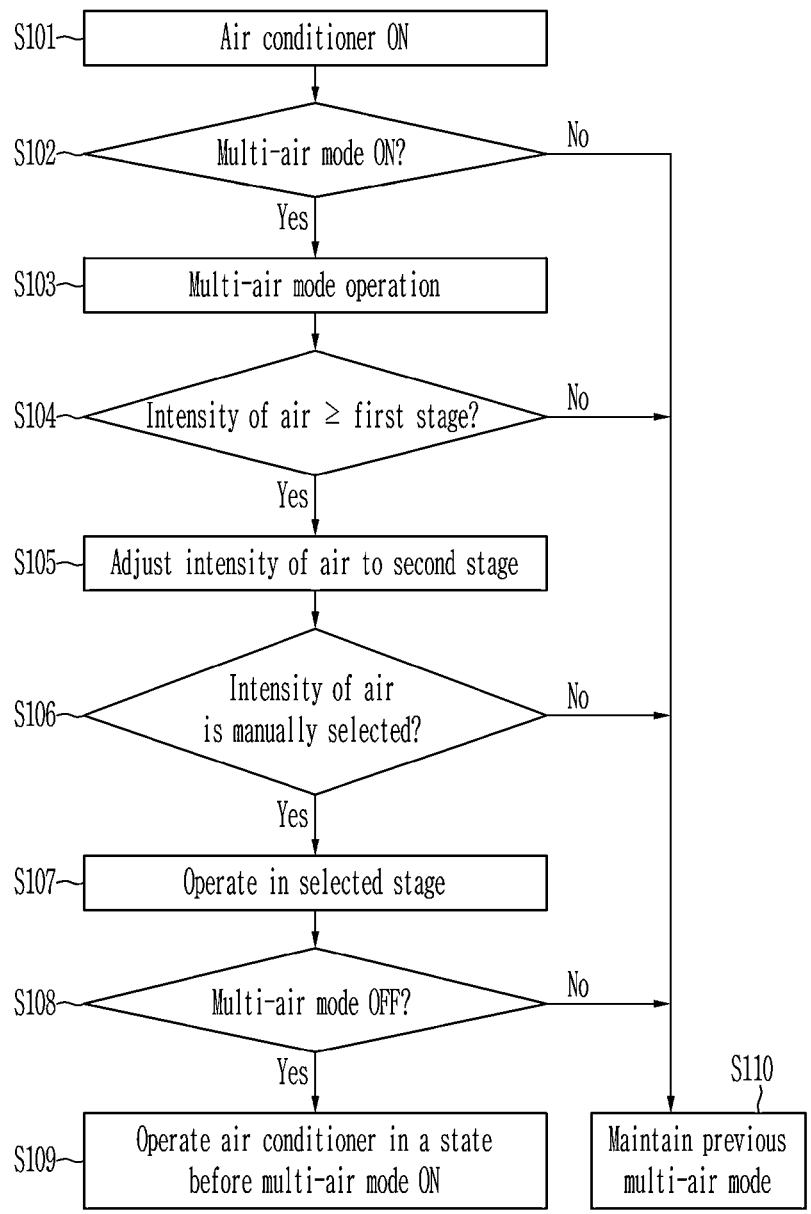
FIG. 13 is a flowchart illustrating a method of controlling an apparatus of multi-air mode for vehicle air conditioner according to an exemplary form of the present disclosure.

FIG. 13 is a flowchart illustrating a method of controlling an apparatus of multi-air mode for vehicle air conditioner according to an exemplary form of the present disclosure.

Referring to FIG. 13, the power of the air conditioner is turned on by the driver through the air conditioner operation unit 40 provided in the vehicle S101.

After that, a controller determines whether the driver has turned on the multi-air mode through the air conditioner operation unit 40 S102. As shown in FIG. 1, a multi-air mode button (DIFFUSE button) 42 is provided on the air conditioner operation unit 40, and when the driver wants to use the multi-air mode, the A/C button is turned on, and the DIFFUSE button 42 is turned on.

In this case, the controller may be implemented with one or more processors operating according to a set program, and the set program may be programmed to perform each step of the method for controlling a multi-air mode device for a vehicle air conditioner according to one form of the present disclosure.

When it is determined that the multi-air mode is ON, the controller operates the air conditioner in the multi-air mode S103.

If it is determined that the multi-air mode is not turned on, the controller operates the air conditioner in a state before the multi-air mode is turned on S110.

After that, the controller determines whether the intensity of the air discharged from the air conditioner is greater than or equal to the first stage S104. In this case, the first stage may be, for example, 4 of 8 stages.

When it is determined that the intensity of air discharged from the air conditioner is equal to or greater than the first stage, the controller may automatically adjust the intensity of the air to a second stage smaller than the first stage S105. In this case, the second stage may be, for example, 3 of 8 stages.

If it is determined that the strength of the air supplied from the air conditioner is not more than the first stage, the controller maintains the strength of the air in the state before the first stage S110.

After that, the controller determines whether the intensity of the air discharged from the air conditioner is manually selected S106. When the driver manually selects the air intensity through the air conditioner operation unit 40, the automatic adjustment of the air intensity is turned off and the driver operates in a corresponding manually selected stage S107.

If it is determined that the intensity of air supplied from the air conditioner is not manually selected, the controller maintains the intensity of the second stage of air S110.

After that, the controller determines whether the driver has turned off the multi-air mode through the air conditioner operation unit 40 S108. When the driver selects the OFF button through the air conditioner operation unit 40, the multi-air mode is turned off. Alternatively, it may be set to turn off the multi-air mode when the driver pushes the DIFFUSE button once more.

When it is determined that the multi-air mode is off, the controller operates the air conditioner in a state before the multi-air mode is turned on S109.

If it is determined that the multi-air mode is not turned off, the previous multi-air mode is maintained S110.

Figure 14:
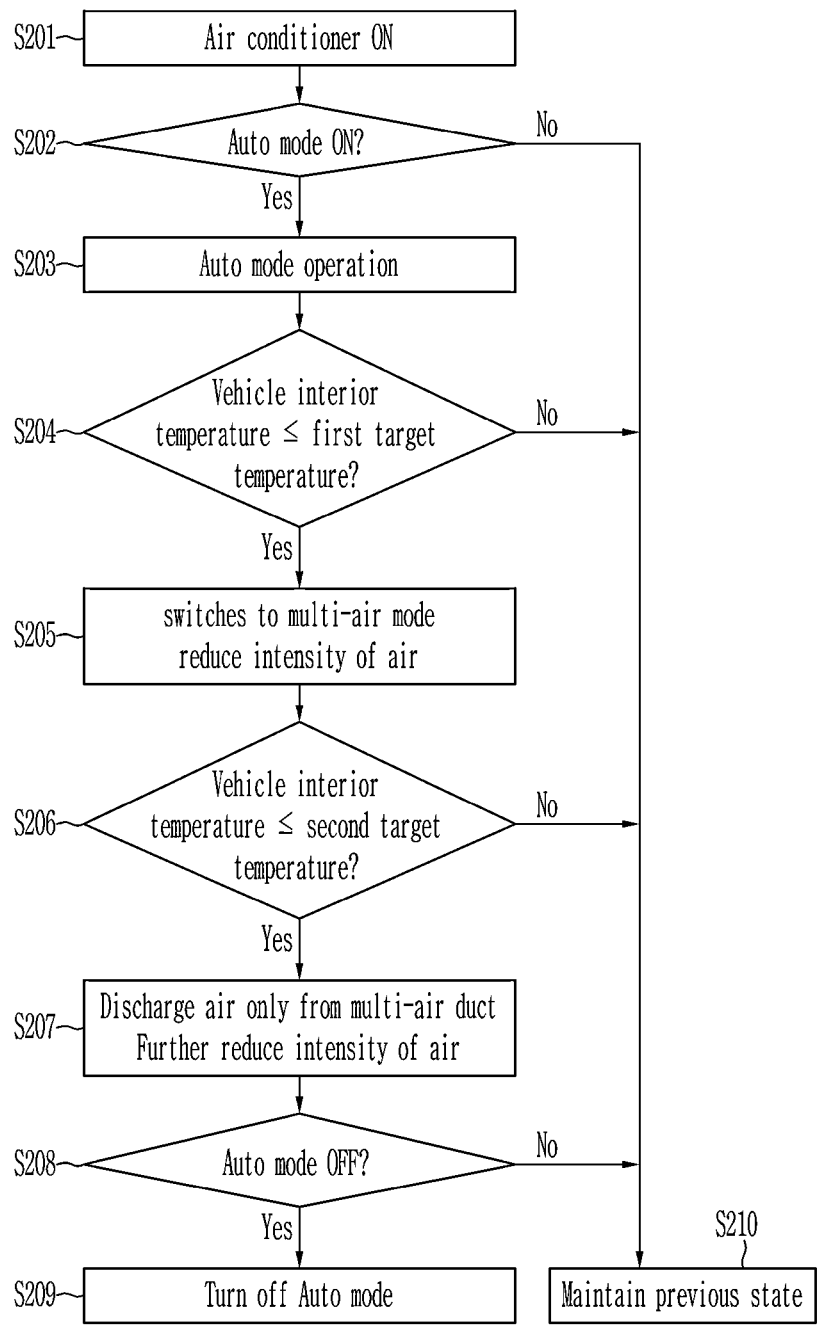
FIG. 14 is a flowchart illustrating a method of controlling an apparatus of multi-air mode for vehicle air conditioner according to another form of the present disclosure.

FIG. 14 is a flowchart illustrating a method of controlling an apparatus of multi-air mode for vehicle air conditioner according to another form of the present disclosure.

Referring to FIG. 14, the power of the air conditioner is turned on by the driver through the air conditioner operation unit 40 provided in the vehicle S201.

After that, the controller determines whether the driver has turned on the auto mode through the air conditioner operation unit 40 S202. As shown in FIG. 1, a auto mode button (AUTO button) is provided on the air conditioner operation unit 40, and when the driver wants to use the auto mode, the A/C button is turned on, and the AUTO button is turned on.

When it is determined that the auto mode is ON, the controller operates the air conditioner in the auto mode S203.

If it is determined that the auto mode is not turned on, the controller operates the air conditioner in a state before the auto mode is turned on S210.

After that, the controller determines whether the vehicle interior temperature has reached the first target temperature S204. When it is determined that the vehicle interior temperature has reached the first target temperature, the controller switches to the multi-air mode, and controls to discharge air from the multi-air duct, the vent duct, and the floor duct into the vehicle interior and reduce the intensity of the air to a certain level S205.

After that, the controller determines whether the vehicle interior temperature has reached a second target temperature lower than the first target temperature S206.

When it is determined that the vehicle interior temperature has reached the second target temperature, the controller discharges air into the vehicle interior only from the multi-air duct and further reduces the intensity of the air S207.

If it is determined that the vehicle interior temperature has not reached the second target temperature, the previous state is maintained S210.

After that, the controller determines whether the driver has turned off the auto mode through the air conditioner operation unit 40 S208. When the driver selects the OFF button through the air conditioner operation unit 40, the auto mode is turned off. Alternatively, it may be set to turn off the auto mode when the driver pushes the AUTO button once more.

If it is determined that the automatic mode is off, the controller turns off the automatic mode S209, and if it is determined that the automatic mode is not turned off, the previous automatic mode state is maintained S210.

Like this, according to exemplary forms of the present disclosure, it is possible to provide a comfortable vehicle interior environment by providing wind discharged through various air discharge units of the air conditioner inside the vehicle and adjusting the air volume according to the internal conditions of the vehicle.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

| | |
|---|---|
| 10: air conditioner | 20: air duct unit |
| 22: defrost duct | 24: multi-air duct |
| 25: pad | 26: vent duct |
| 27: dome door | 28: floor duct |
| 29: flat door | 30: multi-air discharge unit |
| 32: left side discharge unit | 34: right side discharge unit |
| 33, 35: multi-air discharge hole | 36: stepped portion |
| 40: operation unit | |

What is claimed is:

1. A method of controlling an apparatus of multi-air mode for an air conditioner of a vehicle, the method comprising:
   turning on, by a driver using an air conditioner operation unit provided in the vehicle, power to the air conditioner;
   turning on, by the driver, a multi-air mode through the air conditioner operation unit;
   operating, by a controller, the air conditioner operation unit in the multi-air mode;
   determining, by the controller, whether an intensity of air discharged from the air conditioner is greater than or equal to a first stage;
   in response to determining that the intensity of air discharged from the air conditioner is greater than or equal to the first stage, automatically adjusting, by the controller, the intensity of the air to a second stage less than the first stage;
   after automatically adjusting the intensity of the air to the second stage, determining, by the controller, whether the intensity of the air discharged from the air conditioner is manually selected;
   in response to determining that the intensity of the air discharged from the air conditioner is manually selected, operating at a manually selected stage;
   turning off, by the driver, the multi-air mode through the air conditioner operation unit; and
   operating, by the controller, the air conditioner operation unit in a state before the multi-air mode is turned on.

2. The method of claim 1, further comprising:
   in response to determining that the multi-air mode is not turned on, operating, by the controller, the air conditioner in a state before the multi-air mode is turned on.

3. The method of claim 1, further comprising:
   in response to determining that the intensity of air discharged from the air conditioner is less the first stage, maintaining, by the controller, the intensity of the air in a state before the first stage.

4. The method of claim 1, further comprising:
   in response to determining that the intensity of the air discharged from the air conditioner is not manually selected, maintaining, by the controller, the intensity of air in a state of the second stage.

* * * * *